(12) United States Patent
Dai

(10) Patent No.: US 11,061,464 B2
(45) Date of Patent: Jul. 13, 2021

(54) ELECTRONIC DEVICE, METHOD FOR REDUCING POWER CONSUMPTION, AND APPARATUS

(71) Applicant: Huawei Technologies Co., Ltd., Shenzhen (CN)

(72) Inventor: Renjun Dai, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/651,729

(22) PCT Filed: Sep. 29, 2017

(86) PCT No.: PCT/CN2017/104359
§ 371 (c)(1),
(2) Date: Mar. 27, 2020

(87) PCT Pub. No.: WO2019/061287
PCT Pub. Date: Apr. 4, 2019

(65) Prior Publication Data
US 2020/0257353 A1    Aug. 13, 2020

(51) Int. Cl.
*G06F 1/3234* (2019.01)
*G06F 1/26* (2006.01)
*G06F 13/42* (2006.01)

(52) U.S. Cl.
CPC ............ *G06F 1/3253* (2013.01); *G06F 1/266* (2013.01); *G06F 13/4282* (2013.01); *G06F 2213/0042* (2013.01)

(58) Field of Classification Search
CPC .... G06F 1/266; G06F 1/3253; G06F 13/4282; G06F 2213/0042
USPC ........................................................ 713/324
See application file for complete search history.

(56) References Cited

U.S. PATENT DOCUMENTS

| | | | | |
|---|---|---|---|---|
| 7,623,667 | B2* | 11/2009 | Sander ................. | H04R 1/1041 381/74 |
| 9,400,546 | B1* | 7/2016 | Agarwal ............... | G06F 1/3296 |
| 9,949,047 | B2* | 4/2018 | Ryu ..................... | H04R 29/001 |
| 10,524,039 | B2* | 12/2019 | Ooi ..................... | H04R 1/1041 |
| 10,628,172 | B2* | 4/2020 | Kulkarni ............... | G06F 9/4411 |
| 2004/0106424 | A1 | 6/2004 | Yoshizawa | |
| 2008/0039072 | A1* | 2/2008 | Bloebaum ........... | H04M 1/6058 455/425 |

(Continued)

FOREIGN PATENT DOCUMENTS

| | | |
|---|---|---|
| CN | 101105710 A | 1/2008 |
| CN | 101853970 A | 10/2010 |

(Continued)

*Primary Examiner* — Brian T Misiura
(74) *Attorney, Agent, or Firm* — Conley Rose, P.C.

(57) ABSTRACT

An electronic device includes a key circuit, a first universal serial bus (USB) circuit coupled to the key circuit, where the key circuit outputs different signals when different keys on the key circuit are pressed. The first USB circuit is configured for USB communication, and a first power delivery (PD) circuit is coupled to the key circuit and configured to convert a signal output by the key circuit into a PD signal and transmit the PD signal to a second electronic device to enable the second electronic device to process the key operation when the first USB circuit is in a power-off state and a key operation is performed on the key circuit.

20 Claims, 5 Drawing Sheets

(56) References Cited

U.S. PATENT DOCUMENTS

| | | | |
|---|---|---|---|
| 2008/0079991 A1 | 4/2008 | Horikoshi et al. | |
| 2008/0164994 A1* | 7/2008 | Johnson | H04R 1/1041 |
| | | | 340/533 |
| 2008/0208376 A1 | 8/2008 | Jung | |
| 2016/0034333 A1 | 2/2016 | Ozawa et al. | |
| 2016/0269193 A1 | 9/2016 | Zwart et al. | |
| 2017/0325320 A1 | 11/2017 | Wendt et al. | |
| 2017/0373881 A1* | 12/2017 | Yu | G06F 3/0613 |
| 2018/0067884 A1* | 3/2018 | Loza | H04R 1/105 |
| 2018/0139528 A1* | 5/2018 | Wen | A61B 5/6803 |
| 2018/0302507 A1* | 10/2018 | Johnson | H04M 1/6033 |
| 2018/0307287 A1* | 10/2018 | Benson | G06F 1/189 |
| 2018/0364794 A1* | 12/2018 | Yl | G06F 1/266 |
| 2020/0150976 A1* | 5/2020 | Lee | G06F 1/266 |

FOREIGN PATENT DOCUMENTS

| | | |
|---|---|---|
| CN | 105094263 A | 11/2015 |
| CN | 105912299 A | 8/2016 |
| CN | 106055507 A | 10/2016 |
| CN | 107122037 A | 9/2017 |
| CN | 107148806 A | 9/2017 |
| CN | 206931736 U | 1/2018 |
| WO | 2017143471 A1 | 8/2017 |

* cited by examiner

ELECTRONIC DEVICE, METHOD FOR REDUCING POWER CONSUMPTION, AND APPARATUS

CROSS-REFERENCE TO RELATED APPLICATIONS

This application is a U.S. National Stage of International Patent Application No. PCT/CN2017/104359 filed on Sep. 29, 2017, which is hereby incorporated by reference in its entirety.

TECHNICAL FIELD

This application relates to the electronic field, and in particular, to an electronic device, a method for reducing power consumption, and an apparatus.

BACKGROUND

To implement miniaturization and waterproof performance of a mobile phone, a growing number of mobile phone manufacturers replace a conventional 3.5 mm (millimeter) headset jack with a Type-C interface, and a Type-C headset is plugged into the mobile phone through the Type-C interface. After the Type-C headset is plugged into the mobile phone, the mobile phone supplies power to the Type-C headset. Even if no service is performed between the mobile phone and the Type-C headset, a universal serial bus (universal serial bus, USB for short) module in the mobile phone and a USB module in the headset still need to maintain a communication state, increasing power consumption of the mobile phone.

SUMMARY

Embodiments of this application provide an electronic device, a method for reducing power consumption, and an apparatus, to reduce power consumption of a mobile phone.

To achieve the foregoing objective, the embodiments of this application provide the following technical solutions.

According to a first aspect, a first electronic device is provided, including: a key module and a first USB module connected to the key module, where the key module outputs different signals when different keys on the key module are pressed, and the first USB module is configured for USB communication. The first electronic device further includes a first PD module, connected to the key module, and configured to: when the first USB module is in a power-off state and a key operation is performed on the key module, convert a signal output by the key module into a PD signal and transmit the PD signal to a second electronic device, to enable the second electronic device to process the key operation, where the second electronic device is an electronic device connected to the first electronic device. When the first USB module is in the power-off state and the key operation is performed on the key module, the first electronic device provided in the first aspect may convert the signal output by the key module into the PD signal and transmit the PD signal to the second electronic device by using the first PD module, to enable the second electronic device to process the key operation. Because the second electronic device may still be enabled to process the key operation when the first USB module is in the power-off state, the USB modules in the first electronic device and the second electronic device may be enabled to power off when no service is performed between the first electronic device and the second electronic device, thereby reducing power consumption of the first electronic device and the second electronic device.

In a possible design, the second electronic device is connected to the first electronic device by using a Type-C interface.

In a possible design, the first electronic device further includes an analog-to-digital conversion module, connected to the first USB module, and configured to perform conversion between an analog signal and a digital signal.

In a possible design, the first electronic device further includes: a play module, connected to the analog-to-digital conversion module, and configured to play an audio signal output by the analog-to-digital conversion module; and a collection module, connected to the analog-to-digital conversion module, and configured to: collect a sound signal, and input the converted sound signal to the analog-to-digital conversion module.

In a possible design, the first electronic device is a Type-C device, and/or the second electronic device is a terminal device.

According to a second aspect, a method for reducing power consumption is provided, where the method is applied to a second electronic device, the second electronic device includes a control processing module and a second USB module connected to the control processing module, and the method includes: determining, by the control processing module, that no service is performed with a first electronic device; controlling, by the control processing module, the second USB module to send a power-off instruction to a first USB module in the first electronic device, where the power-off instruction is used to instruct the first USB module to power off; and controlling, by the control processing module, the second USB module to power off. When no service is performed between the second electronic device and the first electronic device, there is no need to maintain a communication state between the second USB module and the first USB module. Therefore, in the method according to the second aspect, after determining that no service is performed with the first electronic device, the control processing module controls the second USB module to send the power-off instruction to the first USB module, to enable the first USB module to power off, and the control processing module further controls the second USB module to power off, thereby reducing power consumption of the second electronic device and the first electronic device, and increasing battery life of the second electronic device and the first electronic device.

In a possible design, after the controlling, by the control processing module, the second USB module to power off, the method further includes: determining, by the control processing module, to transmit data to the first electronic device; starting, by the control processing module, the second USB module; waking up, by the second USB module, the first USB module and establishing a USB link to the first USB module; and sending, by the second USB module, the data to the first USB module over the USB link. In this possible implementation, after the first USB module and the second USB module power off when the control processing module determines to transmit the data to the first electronic device, the second USB module may be started and the first USB module may be woken up, to ensure normal communication between the second electronic device and the first electronic device.

In a possible design, the second electronic device further includes a second PD module connected to the control processing module, and after the controlling, by the control processing module, the second USB module to power off, the method further includes: receiving, by the second PD module, a PD signal sent by a first PD module in the first electronic device, where the PD signal is a signal obtained after a signal output by the key module is converted by the first PD module when a key operation on a key module in the first electronic device is performed; sending, by the second PD module, the PD signal to the control processing module; and processing, by the control processing module, the key operation after the PD signal is received. In this possible implementation, after the first USB module and the second USB module power off, when a user performs a key operation, the first PD module may transmit the PD signal to the second PD module, so that the second electronic device may process the key operation, to ensure normal communication between the second electronic device and the first electronic device.

In a possible design, the processing, by the control processing module, the key operation after the PD signal is received includes: starting, by the control processing module, the second USB module after the PD signal is received; waking up, by the second USB module, the first USB module and establishing a USB link to the first USB module; obtaining, by the second USB module, a key value of the key operation, and sending the key value of the key operation to the control processing module; and performing, by the control processing module, an operation corresponding to the key value based on the key value of the key operation.

In a possible design, before the controlling, by the control processing module, the second USB module to power off, the method further includes: receiving, by the second USB module, an instruction response from the first USB module; and determining, by the second USB module according to the instruction response, that the first USB module successfully receives the power-off instruction. In this possible implementation, the second USB module may power off after the first USB module successfully receives the power-off instruction, to avoid a case in which subsequent communication between the first USB module and the second USB module is affected because one port of the first USB module and the second USB module powers off and the other port does not power off.

In a possible design, the second electronic device is a terminal device, and/or the first electronic device is a Type-C device.

According to a third aspect, a method for reducing power consumption is provided, where the method is applied to a first electronic device, the first electronic device includes a first USB module, and the method includes: receiving, by the first USB module, a power-off instruction from a second USB module in a second electronic device; and performing, by the first USB module, a power-off operation according to the power-off instruction. When no service is performed between the second electronic device and the first electronic device, there is no need to maintain a communication state between the second USB module and the first USB module. Therefore, in the method according to the third aspect, after determining that no service is performed with the first electronic device, the control processing module controls the second USB module to send the power-off instruction to the first USB module, to enable the first USB module to power off, and the control processing module further controls the second USB module to power off, thereby reducing power consumption of the second electronic device and the first electronic device, and increasing battery life of the second electronic device and the first electronic device.

In a possible design, after the performing, by the first USB module, a power-off operation according to the power-off instruction, the method further includes: when the second electronic device needs to transmit data to the first electronic device, being woken up, by the first USB module, by the second USB module and establishing a USB link to the second USB module; and receiving, by the first USB module, the data sent by the second USB module over the USB link. In this possible implementation, after the first USB module and the second USB module power off, when the control processing module determines to transmit the data to the first electronic device, the second USB module may be started and the first USE module may be woken up, to ensure normal communication between the second electronic device and the first electronic device.

In a possible design, the first electronic device further includes a first PD module and a key module, the key module is connected to the first PD module and the first USB module, and after the performing, by the first USB module, a power-off operation according to the power-off instruction, the method further includes: converting, by the first PD module, a signal output by the key module, to obtain a PD signal when a key operation is performed on the key module; and sending, by the first PD module, the PD signal to a second PD module in the second electronic device, where the PD signal is used for the second electronic device to process the key operation. In this possible implementation, after the first USB module and the second USB module power off, when a user performs a key operation, the first PD module may transmit the PD signal to the second PD module, so that the second electronic device may process the key operation, to ensure normal communication between the second electronic device and the first electronic device.

In a possible design, after the receiving, by the first USB module, a power-off instruction from a second USB module in a second electronic device, the method further includes: sending, by the first USB module, an instruction response to the second USB module, where the instruction response is used to indicate to the second USB module that the first USB module successfully receives the power-off instruction. In this possible implementation, the second USB module may power off after the first USB module successfully receives the power-off instruction, to avoid a case in which subsequent communication between the first USB module and the second USB module is affected because one port of the first USB module and the second USB module powers off and the other port does not power off.

In a possible design, the second electronic device is a terminal device, and/or the first electronic device is a Type-C device.

According to a fourth aspect, a second electronic device is provided. The second electronic device has a function of implementing any method according to the second aspect. The function may be implemented by using hardware, or may be implemented by hardware executing corresponding software. The hardware or software includes one or more units corresponding to the foregoing function.

According to a fifth aspect, a first electronic device is provided. The first electronic device has a function of implementing any method according to the third aspect. The function may be implemented by using hardware, or may be implemented by hardware executing corresponding software. The hardware or software includes one or more units corresponding to the foregoing function.

According to a sixth aspect, a second electronic device is provided. The second electronic device includes: a memory and a processor. The memory is configured to store a computer-executable instruction, and the processor executes the computer-executable instruction stored in the memory, to enable the second electronic device to implement any method according to the second aspect.

According to a seventh aspect, a first electronic device is provided. The first electronic device includes: a memory and a processor. The memory is configured to store a computer-executable instruction, and the processor executes the computer-executable instruction stored in the memory, to enable the first electronic device to implement any method according to the third aspect.

According to an eighth aspect, an apparatus is provided. The apparatus may exist in a form of a chip product. The apparatus includes a processor, a memory, and a transceiver component. The transceiver component includes an input/output circuit, the memory is configured to store a computer-executable instruction, and the processor implements any method according to the second aspect or the third aspect by executing the computer-executable instruction stored in the memory.

According to a ninth aspect, a computer-readable storage medium is provided. The computer-readable storage medium includes an instruction, and when run on a computer, the instruction enables the computer to perform any method according to the second aspect or the third aspect.

According to a tenth aspect, a computer program product including an instruction is provided. When run on a computer, the instruction enables the computer to perform any method according to the second aspect or the third aspect.

For technical effects of any design in the fourth aspect to the tenth aspect, refer to technical effects of different designs in the first aspect to the third aspect. Details are not described herein again.

DESCRIPTION OF EMBODIMENTS

Following describes technical solutions in embodiments of this application with reference to accompanying drawings in the embodiments of this application. In description of this application, "/" means "or" unless otherwise specified. For example, A/B may represent A or B. In this specification, "and/or" describes only an association relationship to describe associated objects and represents that three relationships may exist. For example, A and/or B may represent the following three cases: Only A exists, both A and B exist, and only B exists. In addition, in the descriptions of this application, "a plurality of" means two or more than two.

Figure 1:
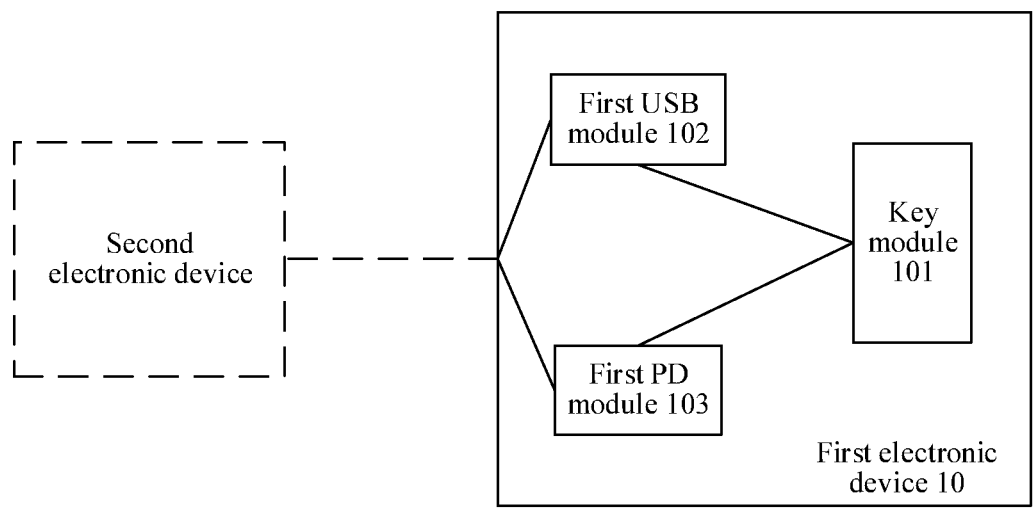
FIG. 1 is a schematic composition diagram of a first electronic device according to an embodiment of this application.

An embodiment of this application provides a first electronic device 10, as shown in FIG. 1, including a key module 101 and a first USB module 102 connected to the key module 101. The key module 101 outputs different signals when different keys on the key module 101 are pressed, and the first USB module 102 is configured for USB communication. Refer to FIG. 1, the first electronic device 10 may further includes:

a first power delivery (power delivery, PD for short) module 103, connected to the key module 101, and configured to: when the first USB module 102 is in a power-off state and a key operation is performed on the key module 101, convert a signal output by the key module 101 into a PD signal and transmit the PD signal to a second electronic device, to enable the second electronic device to process the key operation. The second electronic device is an electronic device connected to the first electronic device 10.

Optionally, the first electronic device 10 may be a Type-C device, and certainly, or may be another electronic device having the foregoing structure; the second electronic device may be a terminal device, and certainly, or may be another electronic device that may be connected to the first electronic device 10. The Type-C device may be a device that connects to another electronic device through a Type-C interface. For example, the Type-C device may be a sounder, a headset, or another device. The terminal device may be a mobile phone, a computer, an in-vehicle device, a wearable device, or the like.

In this embodiment of this application, the first electronic device 10 provided in this embodiment of this application is described by using an example in which the first electronic device 10 is a headset.

Figure 2:
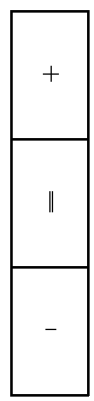
FIG. 2 is a schematic diagram of a key module on a first electronic device according to an embodiment of this application.

Specifically, different keys on the key module 101 may be electronic keys, touch keys, or other keys on the first electronic device 10. The key module 101 may output different signals when different keys on the key module 101 are pressed, and the signal may be an analog signal or a digital signal. The first USB module 102 processes the signal, to obtain a key value of the key operation operation, and sends the key value to the second electronic device, so that the second electronic device may perform an operation corresponding to the key value based on the key value of the key operation, thereby affecting output of the first electronic device 10. For example, if the first electronic device 10 is a headset, refer to FIG. 2, keys on the key module 101 may include "+", "−", and "∥". For example, if a user listens to music by using the headset, the key "+" may be configured to control the second electronic device to increase the volume, the key "−" may be configured to control the second electronic device to decrease the volume, and the key "∥" may be configured to control the second electronic device to pause (or play) the music.

The first PD module 103 may monitor whether a key operation is performed on the key module 101 when the first USB module 102 is in a power-off state, and when a key operation is performed, a PD signal is sent to the second electronic device. The PD signal may be one interrupt signal.

Figure 3:
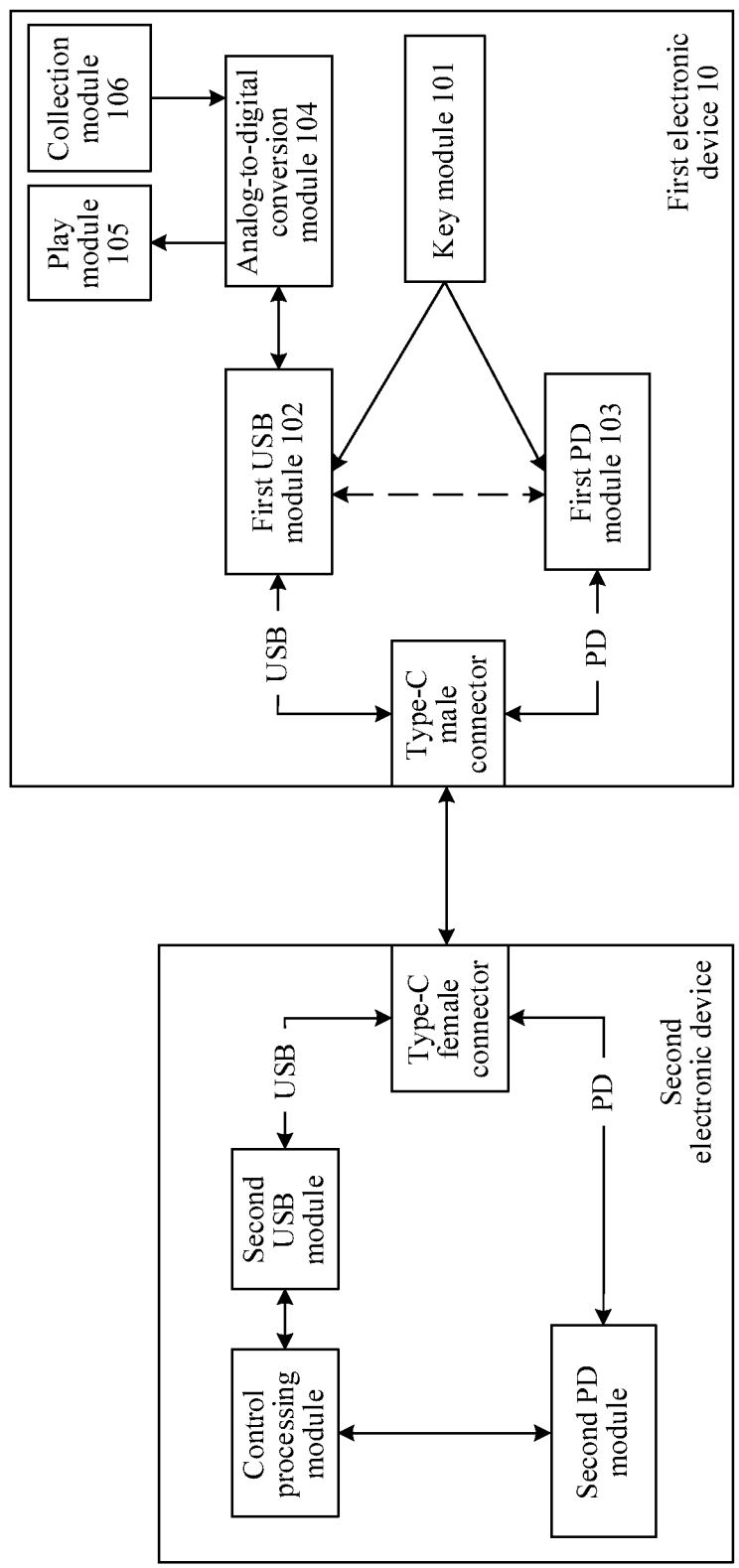
FIG. 3 is a schematic composition diagram of a first electronic device and second electronic device according to an embodiment of this application.
Figure 4:
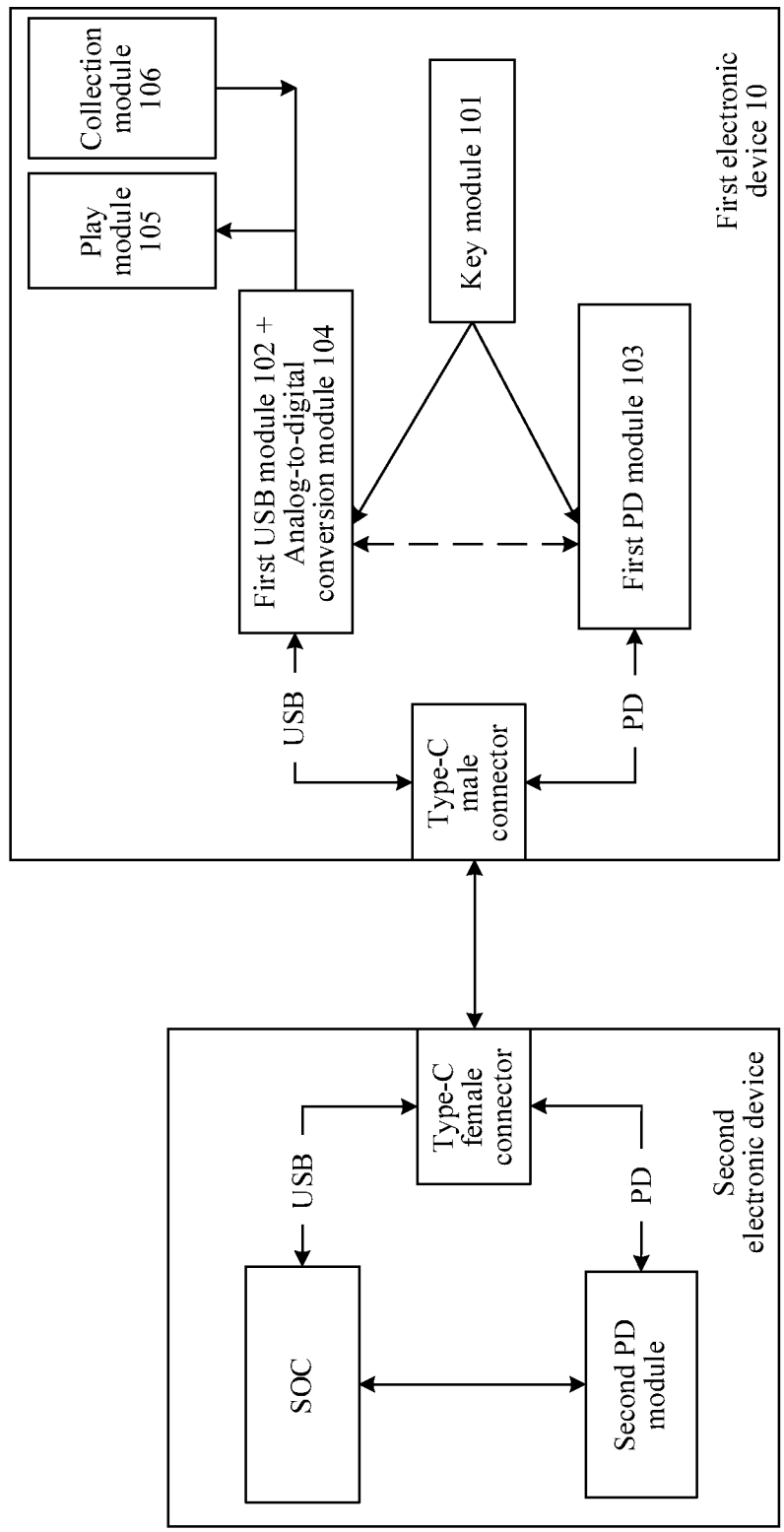
FIG. 4 is a schematic composition diagram of another first electronic device and second electronic device according to an embodiment of this application.
Figure 5:
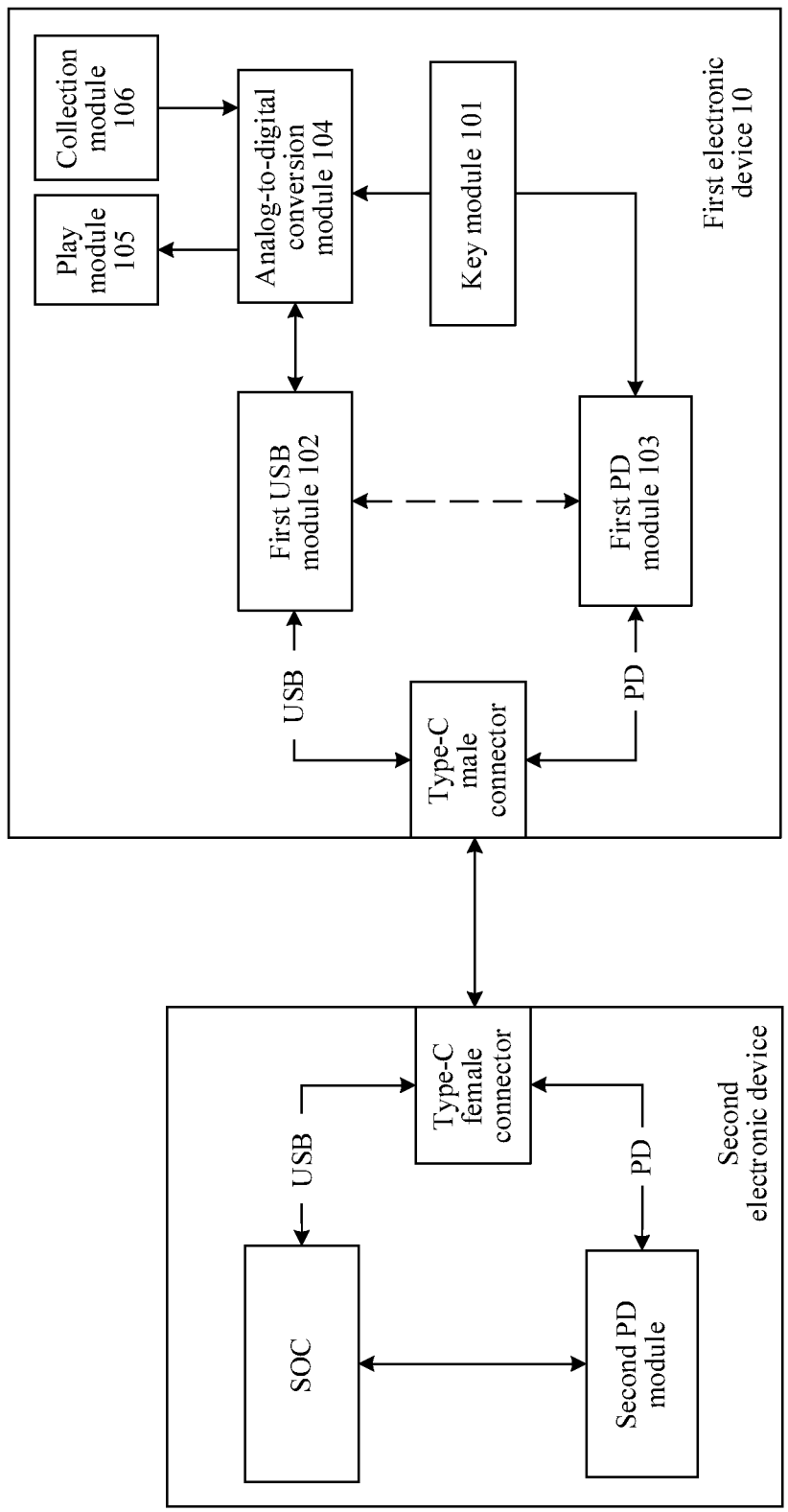
FIG. 5 is a schematic composition diagram of still another first electronic device and second electronic device according to an embodiment of this application.

Optionally, the second electronic device and the first electronic device 10 may be connected to each other through the Type-C interface. In this case, the Type-C interface is a physical connection channel between the first electronic device 10 and the second electronic device. Refer to FIG. 3, FIG. 4, or FIG. 5, the Type-C interface may include a Type-C female connector and a Type-C male connector. The Type-C female connector may be disposed in the second electronic device, and the Type-C male connector may be disposed in the first electronic device 10; or the Type-C male connector may be disposed in the second electronic device, and the Type-C female connector may be disposed in the first electronic device 10.

The first USB module 102 is configured for USB communication. Specifically, the first USB module 102 may be in USB communication with a second USB module in the second electronic device. For example, refer to FIG. 3, the second electronic device may include a control processing module, a second USB module, and a second PD module. The control processing module is connected to the second USB module and the second PD module. The Type-C female connector is connected to the second PD module and the second USB module. The second PD module may identify the PD signal transmitted by the first PD module 103 in the first electronic device 10.

Specifically, refer to FIG. 4, the control processing module and the second USB module may alternatively be integrated in a system on a chip (system on a chip, SOC for short). The SOC is a control hub of the second electronic device, and may control the USB communication between the second USB module and the first USB module 102, identify the key value of the key operation transmitted by the first electronic device 10 and perform an operation corresponding to the key value, or may control the first USB module 102 to power off or wake up the first USB module 102.

Optionally, refer to FIG. 3 or FIG. 5, the first electronic device 10 may further include an analog-to-digital conversion module 104, connected to the first USB module 102, and configured to perform conversion between an analog signal and a digital signal.

In this case, the key module 101 may directly be connected to the first USB module 102 (referring to FIG. 3). In this case, when a key on the key module 101 is pressed, the key module 101 may output a digital signal, and the first USB module 102 may directly process the digital signal, to obtain a key value of the key operation, and transmit the key value to the second electronic device, for the second electronic device to process a key operation. The key module 101 may alternatively be connected to the first USB module 102 through the analog-to-digital conversion module 104 (referring to FIG. 5). In this case, when a key on the key module 101 is pressed, the key module 101 may output an analog signal, the analog-to-digital conversion module 104 converts the analog signal into a digital signal and transmits the digital signal to the first USB module 102 for processing, and the first USB module 102 may process the digital signal, to obtain a key value of the key operation, and transmit the key value to the second electronic device, for the second electronic device to process a key operation.

During actual implementation, refer to FIG. 4, the analog-to-digital conversion module 104 and the first USB module 102 may be integrated together.

Optionally, refer to FIG. 3, FIG. 4, or FIG. 5, the first electronic device 10 may further include: a play module 105, connected to the analog-to-digital conversion module 104, and configured to play an audio signal output by the analog-to-digital conversion module 104; and a collection module 106, connected to the analog-to-digital conversion module 104, and configured to: collect a sound signal, and input the converted sound signal to the analog-to-digital conversion module 104.

Specifically, the first USB module 102 can receive a USB signal sent by the second electronic device, convert the USB signal into an audio signal to drive the play module 105 to play. If the audio signal is a digital audio signal, the analog-to-digital conversion module 104 converts the digital audio signal into an analog audio signal to drive the play module 105 to play.

The play module 105 may be an audio output device on the first electronic device 10. For example, the play module 105 may be a receiver.

The collection module 106 converts the sound signal into a digital audio signal or an analog audio signal.

Specifically, the first USB module 102 can convert the audio signal output by the collection module 106 into a USB signal, and transmit the audio signal to the second electronic device according to a USB protocol. If the collection module 106 performs conversion on the collected sound signal, and the output signal is an analog audio signal, the analog-to-digital conversion module 104 converts the analog audio signal into a digital audio signal, and transmits the digital audio signal to the first USB module 102.

The collection module 106 may be an audio input module on the first electronic device 10. For example, the collection module 106 may be a microphone.

In addition, refer to FIG. 3, FIG. 4, or FIG. 5, the first PD module 103 may be connected to the first USB module 102, and configured to wake up the first USB module 102 when the first USB module 102 is in a power-off state.

When the first USB module 102 is in the power-off state and the key operation is performed on the key module 101, the first electronic device 10 provided in this embodiment of this application may convert the signal output by the key module 101 into the PD signal and transmit to the second electronic device by using the first PD module 103, to enable the second electronic device to process the key operation. Because the second electronic device may still be enabled to process the key operation when the first USB module 102 is in the power-off state, the USB modules in the first electronic device 10 and the second electronic device may be enabled to power off when no service is performed between the first electronic device 10 and the second electronic device, thereby reducing power consumption of the first electronic device 10 and the second electronic device.

Figure 6:
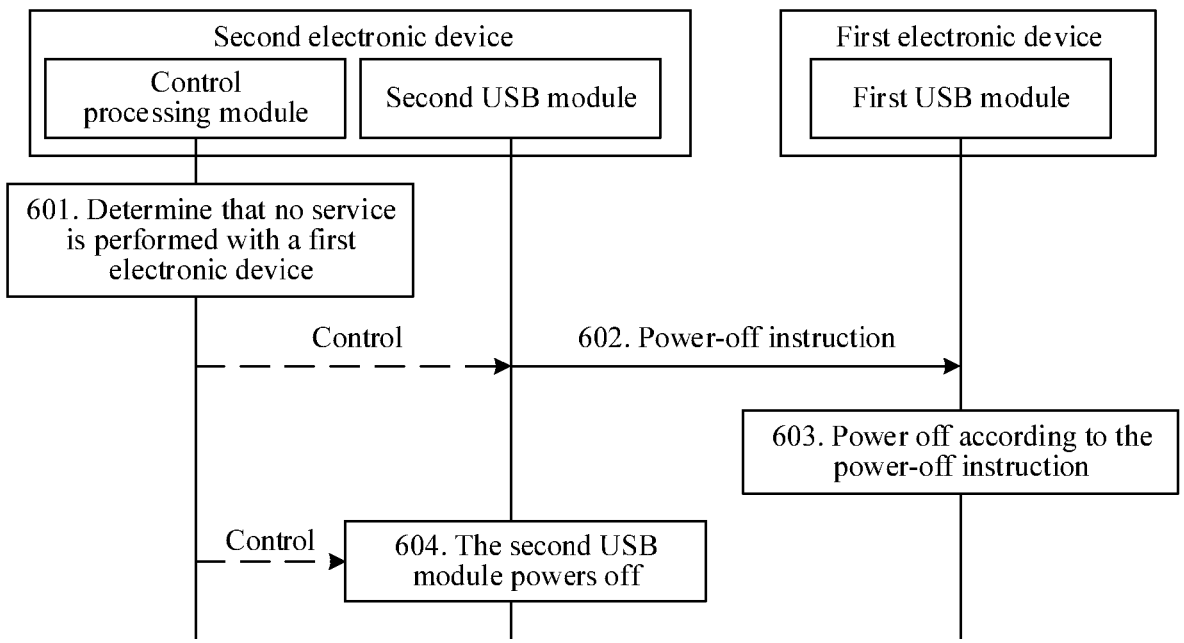
FIG. 6 is a flowchart of a method for reducing power consumption according to an embodiment of this application.

An embodiment of this application further provides a method for reducing power consumption, and the method is applied to a first electronic device and a second electronic device. The first electronic device includes a first USB module, and the second electronic device includes a control processing module and a second USB module connected to the control processing module. For a schematic composition diagram of the first electronic device, refer to FIG. 1, FIG. 3, FIG. 4, or FIG. 5. For a schematic composition diagram of the second electronic device, refer to FIG. 3, FIG. 4, or FIG. 5. As shown in FIG. 6, the method includes the following steps.

601. The control processing module determines that no service is performed with the first electronic device.

Specifically, if a state of no data transmission between the control processing module and the first electronic device is maintained for a time period, the control processing module may determine that no service is performed with the first electronic device; or the control processing module may determine, based on a configuration of a user, that no service is performed with the first electronic device. For example, when the user configures that the first electronic device is not used within a period of time from 1 a.m. to 8 a.m., the control processing module may determine, based on the configuration, that no service is performed with the first electronic device during the period of time from 1 a.m. to 8 a.m.; or the control processing module may determine that no service is performed with the first electronic device after determining that the second electronic device is in a sleep state (that is, the second electronic device is powered on but not in a state of service data transmission). Certainly, the control processing module may further determine, by using another method, that no service is performed with the first electronic device. Details are not described herein again.

602. The control processing module controls a second USB module to send a power-off instruction to a first USB module in the first electronic device, where the power-off instruction is used to instruct the first USB module to power off.

Refer to FIG. 3, FIG. 4, or FIG. 3, the second USB module may send the power-off instruction to the first USB module over a USB link to the first USB module.

603. The first USB module receives the power-off instruction from the second USB module in the second electronic device, and powers off according to the power-off instruction.

604. The control processing module controls the second USB module to power off.

Step 604 is performed after step 602, and there is no limitation to an execution sequence of step 604 and step 603.

When no service is performed between the second electronic device and the first electronic device, there is no need to maintain a communication state between the second USB module and the first USE module. Therefore, in the method according to this embodiment of this application, after determining that no service is performed with the first electronic device, the control processing module controls the second USB module to send the power-off instruction to the first USB module, to enable the first USB module to power off, and the control processing module further controls the second USB module to power off, thereby reducing power consumption of the second electronic device and the first electronic device, and increasing battery life of the second electronic device and the first electronic device.

After step 604, that is, after the first USB module and the second USB module power off, if the second electronic device needs to transmit data to the first electronic device, the following steps may be performed for implementation.

(11) The control processing module determines to transmit data to the first electronic device.

When the second electronic device needs to transmit the data to the first electronic device, the control processing module may determine to transmit the data to the first electronic device. For example, when a user makes a call, the control processing module may determine to transmit data to the first electronic device; or when a music application in the second electronic device is enabled to play music, the control processing module may determine to transmit data to the first electronic device; or when the control processing module determines to output a key prompt tone, the control processing module determines to transmit data to the first electronic device.

(12) The control processing module starts the second USB module.

(13) The second USB module wakes up the first USB module and establishes a USB link to the first USB module; and the first USB module is woken up by the second USB module and establishes a USB link to the second USB module.

(14) The second USB module sends the data to the first USB module over the USB link.

(15) The first USB module receives, over the USB link, the data sent by the second USB module.

After step (15), referring to FIG. 3, FIG. 4, or FIG. 5, the first USB module may convert the data sent by the second USB module into an audio signal to drive a play module to play.

After the first USB module and the second USB module power off, when the control processing module determines to transmit the data to the first electronic device, the second USB module may be started and the first USE module may be woken up, to ensure normal communication between the second electronic device and the first electronic device.

The first electronic device may further include a first PD module and a key module, and the key module is connected to the first PD module and the first USB module. The second electronic device may further include a second PD module connected to the control processing module. After step 604, that is, after the first USB module and the second USB module power off, if the user needs to control output of the first electronic device by using the key module of the first electronic device, the following steps may be performed for implementation.

(21) The first PD module converts a signal output by the key module, to obtain a PD signal when a key operation is performed on the key module.

The signal output by the key module may be an analog signal, or may be a digital signal. The PD signal may be one interrupt signal.

(22) The first PD module sends the PD signal to a second PD module in the second electronic device.

(23) The second PD module receives the PD signal sent by the first PD module in the first electronic device.

(24) The second PD module sends the PD signal to the control processing module.

(25) The control processing module processes the key operation after the PD signal is received.

After the first USB module and the second USB module power off when a user performs a key operation, the first PD module may transmit the PD signal to the second PD module, so that the second electronic device may process the key operation, to ensure normal communication between the second electronic device and the first electronic device.

Optionally, in step (25), during specific implementation, the following may be included: starting, by the control processing module, the second USB module after the PD signal is received; waking up, by the second USB module, the first USB module and establishing a USB link to the first USB module; obtaining, by the second USB module, a key value of the key operation, and sending the key value of the key operation to the control processing module; and performing, by the control processing module, an operation corresponding to the key value based on the key value of the key operation.

The key value of the key operation may be sent by the first USB module to the second USB module, and the key value of the key operation may be a value obtained after the first USB module processes the signal output by the key module. Different signals output by the key module may be processed to obtain different key values, and different key values correspond to different operations. For example, refer to FIG. 2, if a key "+", a key "−", and a key "∥" are pressed, key values obtained by processing of signals output by the key module are 1, 2, and 3 respectively, and operations corresponding to 1, 2, and 3 are respectively increasing volume, decreasing volume, and pausing (or playing) music.

It should be noted that, the first PD module in the first electronic device is still in a standby state after the first USB module powers off, to monitor whether a key operation is performed on the first electronic device. When a signal output by the key module on the first electronic device is detected, the signal is converted into a PD signal, and the PD signal is sent by the second PD module to the control processing module in the second electronic device. Similarly, the second PD module also monitors whether a PD signal is sent to.

Specifically, after receiving the PD signal and starting the second USB module, the control processing module may wake up the first USB module and establish a link to the first USB module in any one of the following manners.

Manner 1. The second USB module wakes up the first USB module and establishes a link to the first USB module.

Manner 2. The control processing module sends a wake-up instruction to the first PD module through the second PD module, the first PD module wakes up the first USB module, and the second USB module establishes a link to the first USB module.

After the first USB module receives the power-off instruction and before step 604, the method further includes: sending, by the first USB module, an instruction response to the second USB module, where the instruction response is used to indicate to the second USB module that the first USB module successfully receives the power-off instruction; receiving, by the second USB module, the instruction response from the first USB module; and determining, by the second USB module according to the instruction response, that the first USB module successfully receives the power-off instruction. The first USB module may power off before sending the instruction response, or may power off after sending the instruction response.

It should be noted that, the second USB module may power off after the first USB module successfully receives the power-off instruction, to avoid a case in which subsequent communication between the first USB module and the second USB module is affected because one port of the first USB module and the second USB module powers off and the other port does not power off.

Optionally, the first electronic device may be a Type-C device, and certainly, or may be another electronic device having the foregoing function; the second electronic device may be a terminal device, and certainly, or may be another electronic device that may be connected to the first electronic device. The Type-C device may be a device that connects to another electronic device through a Type-C interface. For example, the Type-C device may be a sounder, a headset, or another device. The terminal device may be a mobile phone, a computer, an in-vehicle device, a wearable device, or another device.

Optionally, the second electronic device and the first electronic device may be connected to each other through the Type-C interface. The Type-C interface is a physical connection channel between the first electronic device and the second electronic device. Refer to FIG. 3, FIG. 4, or FIG. 5, the Type-C interface may include a Type-C female connector and a Type-C male connector. The Type-C female connector may be disposed in the second electronic device, and the Type-C male connector may be disposed in the first electronic device.

Optionally, refer to FIG. 4 or FIG. 5, the control processing module and the second USB module may be integrated on one SOC.

The first electronic device and the second electronic device shown in FIG. 1, FIG. 3, FIG. 4, or FIG. 5 include a hardware structure and/or a software module that are configured to perform the function of the method shown in FIG.

6. A person of ordinary skill in the art should easily be aware that, in combination with the examples described in the embodiments disclosed in this specification, units and algorithm steps in this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

For example, the first USB module in the first electronic device shown in FIG. 1, FIG. 3, FIG. 4, or FIG. 5 may be configured to perform step 603 shown in FIG. 6, and/or the operations performed by the first USB module in another process described in the embodiments of this application. The control processing module in the second electronic device shown in FIG. 3, FIG. 4, or FIG. 5 may be configured to perform step 601 shown in FIG. 6, and/or the operations performed by the control processing module in another process described in the embodiments of this application; and the second USB module in the second electronic device shown in FIG. 3, FIG. 4, or FIG. 5 may be configured to perform step 602 and step 604 shown in FIG. 6, and/or the operations performed by the second USB module in another process described in the embodiments of this application.

Figure 7:
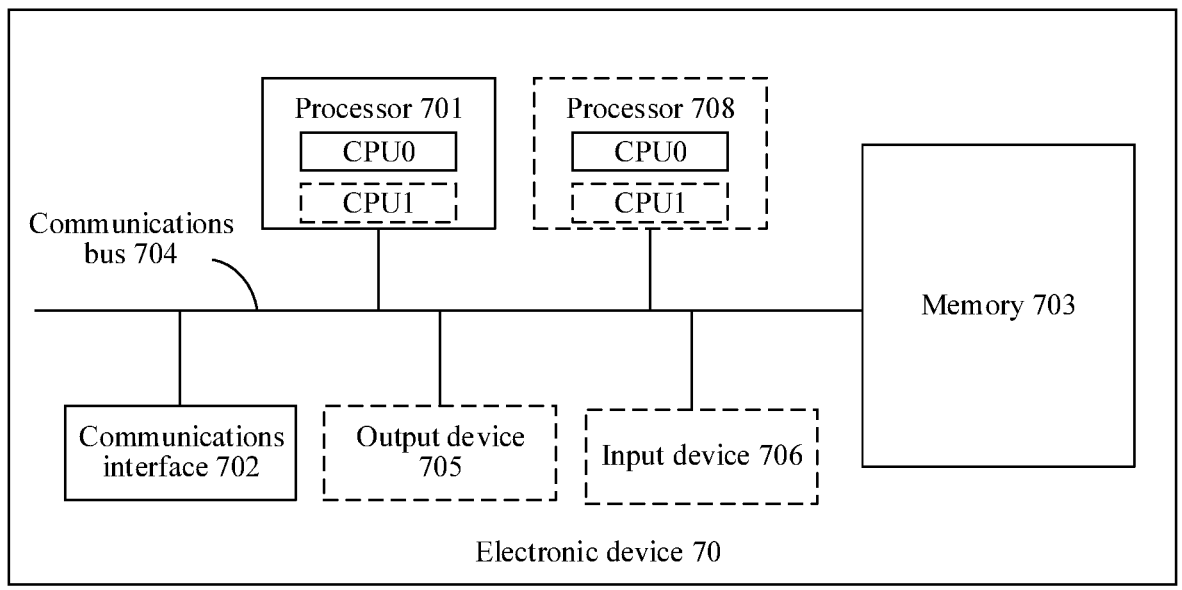
FIG. 7 is a schematic diagram of a hardware structure of an electronic device according to an embodiment of this application.

Refer to FIG. 7, FIG. 7 is a schematic diagram of a hardware structure of an electronic device 70. The electronic device may be the first electronic device or the second electronic device. The operations performed by the modules that have a processing function and that are in the first electronic device or the second electronic device may be completed by a processor 701, and the operations performed by the modules having a sending and receiving function may be completed by a communications interface 702. The electronic device 70 may further include a memory 703. For example, when FIG. 7 is a schematic diagram of a hardware structure of the first electronic device, the processor 701 may be configured to perform step 603 shown in FIG. 6, and/or the operations that may be performed by the processor 701 in another process described in the embodiments of this application. When FIG. 7 is a schematic diagram of a hardware structure of the second electronic device, the processor 701 may be configured to perform step 601 and step 604 shown in FIG. 6, and/or the operations that may be performed by the processor 701 in another process described in the embodiments of this application; and the communications interface 702 may be configured to perform step 602 shown in FIG. 6, and/or the operations that may be performed by the communications interface 702 in another process described in the embodiments of this application.

Refer to FIG. 7, the processor 701, the communications interface 702, and the memory 703 may be connected to each other through a communications bus 704.

The processor 701 may be a general-purpose central processing unit (central processing unit, CPU for short), a microprocessor, an application-specific integrated circuit (application-specific integrated circuit, ASIC for short), or one or more integrated circuits configured to control program execution of the solution of this application.

The communications bus 704 may include a path for transferring information between the foregoing components.

The communications interface 702 may be any apparatus such as a transceiver, and is configured to communicate with another device or communications network.

The memory 703 may be a mad-only memory (read-only memory, ROM for short) or another type of static storage device that can store static information and an instruction, or a random access memory (random access memory, RAM for short) or another type of dynamic storage device that can store information and an instruction, or may be an electrically erasable programmable read-only memory (electrically erasable programmable read-only memory, EEPROM for short), a compact disc read-only memory (compact disc read-only memory, CD-ROM for short) or another compact disc storage medium, optical disc storage medium (including a compact disc, a laser disc, an optical disc, a digital versatile disc, a Blu-ray disc, and the like) and magnetic disk storage medium, another magnetic storage device, or any other medium that can be configured to carry or store desired program code in a form of an instruction or a data structure and that is accessible to a computer, but is not limited thereto. The memory may independently exist and may be connected to the processor through the communications bus. Alternatively, the memory may be integrated with the processor.

The memory 703 is configured to store application program code for performing the solution of this application, and the processor 701 controls the performing. The processor 701 is configured to execute the application program code stored in the memory 703, thereby implementing the method described above.

During specific implementation, in an embodiment, the processor 701 may include one or more CPUs, for example, a CPU0 and a CPU1 in FIG. 7.

During specific implementation, in an embodiment, the electronic device 70 may include a plurality of processors, for example, a processor 701 and a processor 708 in FIG. 7. Each of these processors may be a single-core (single-CPU) processor, or may be a multi-core (multi-CPU) processor. The processor herein may be one or more devices, circuits, and/or processing cores configured to process data (for example, a computer program instruction).

During specific implementation, in an embodiment, the electronic device 70 may further include an output device 705 and an input device 706.

An embodiment of this application further provides an apparatus. The apparatus may exist in a form of a chip product. The apparatus includes a processor, a memory, and a transceiver component. The transceiver component includes an input/output circuit, the memory is configured to store a computer-executable instruction, and the processor implements the foregoing method by executing the computer-executable instruction stored in the memory.

An embodiment of this application further provides a computer-readable storage medium. The computer-readable storage medium includes an instruction, and when run on a computer, the instruction enables the computer to perform the foregoing method.

An embodiment of this application further provides a computer program product including an instruction. When run on a computer, the instruction enables the computer to perform the foregoing method.

All or some of the foregoing embodiments may be implemented by using software, hardware, firmware, or any combination thereof. When a soft are program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD for short)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and the accompanying drawings are merely example description of this application defined by the appended claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for reducing power consumption applied to a second electronic device, wherein the second electronic device comprises a control processing circuit and a second Universal Serial Bus (USB) circuit coupled to the control processing circuit, and wherein the method comprises:
    determining, by the control processing circuit, that a first electronic device does not receive a service;
    controlling, by the control processing circuit in response to determining that the first electronic device does not receive a service, the second USB circuit to send a power-off instruction to a first USB circuit in the first electronic device, wherein the power-off instruction instructs the first USB circuit to power off;
    receiving, by the second USB circuit, an instruction response from the first USB circuit;

determining, by the second USB circuit according to the instruction response, that the first USB circuit has received the power-off instruction; and controlling, by the control processing circuit, the second USB circuit to power off.

2. The method of claim 1, wherein after controlling the second USB circuit to power off, the method further comprises:

determining, by the control processing circuit, to transmit data to the first electronic device;

starting, by the control processing circuit, the second USB circuit;

waking up, by the second USB circuit, the first USB circuit;

establishing, by the second USB circuit, a USB link to the first USB circuit; and sending, by the second USB circuit, the data to the first USB circuit over the USB link.

3. The method of claim 1, wherein the second electronic device further comprises a second power delivery (PD) circuit coupled to the control processing circuit, and wherein after controlling the second USB circuit to power off, the method further comprises:

receiving, by the second PD circuit, a PD signal from a first PD circuit in the first electronic device, wherein the PD signal is based on a key operation performed on a key circuit in the first electronic device;

sending, by the second PD circuit, the PD signal to the control processing circuit; and processing, by the control processing circuit, the key operation after receiving the PD signal.

4. The method of claim 3, further comprising:

starting, by the control processing circuit, the second USB circuit after receiving the PD signal;

waking up, by the second USB circuit, the first USB circuit;

establishing, by the second USB circuit, a USB link to the first USB circuit;

obtaining, by the second USB circuit, a key value of the key operation;

sending, by the second USB circuit, the key value to the control processing circuit; and performing, by the control processing circuit, an operation corresponding to the key value based on the key value.

5. The method of claim 1, wherein the first electronic device comprises a Type-C device.

6. The method of claim 1, wherein the second electronic device is a terminal device.

7. The method of claim 3, further comprising an analog-to-digital conversion circuit coupled to the key circuit and configured to convert the signal from an analog signal to a digital signal wherein the second electronic device is a terminal device.

8. The method of claim 7, further comprising a play circuit coupled to the analog-to-digital conversion circuit and configured to play an audio signal output by the analog-to-digital conversion circuit.

9. The method of claim 7, further comprising a collection circuit coupled to the analog-to-digital conversion circuit and configured to:

collect a sound signal; and input the sound signal to the analog-to-digital conversion circuit.

10. The method of claim 1, further comprising coupling the first electronic device to the second electronic device using Type-C USB interface.

11. A method for reducing power consumption applied to a first electronic device, wherein the first electronic device comprises a first Universal Serial Bus (USB) circuit, and wherein the method comprises:

receiving, by the first USB circuit, a power-off instruction from a second USB circuit in a second electronic device;

sending, by the first USB circuit, an instruction response to the second USB circuit, wherein the instruction response indicates to the second USB circuit that the first USB circuit has received the power-off instruction; and performing, by the first USB circuit, a power-off operation according to the power-off instruction.

12. The method of claim 11, wherein after performing the power-off operation, the method further comprises:

receiving a wake-up signal, by the first USB circuit, from the second USB circuit, and based on a determination that the second electronic device transmits data to the first electronic device;

establishing, by the first USB circuit, a USB link to the second USB circuit; and receiving, by the first USB circuit, the data from the second USB circuit over the USB link.

13. The method of claim 11, wherein the first electronic device further comprises a first power delivery (PD) circuit and a key circuit, wherein the key circuit is coupled to the first PD circuit and the first USB circuit, and wherein after performing the power-off operation, the method further comprises:

receiving, by the key circuit, a key operation;

outputting, by the key circuit, a signal based on the key operation;

converting, by the first PD circuit, the signal to obtain a PD signal; and sending, by the first PD circuit, the PD signal to a second PD circuit in the second electronic device to enable the second electronic device to process the key operation.

14. The method of claim 11, wherein the first electronic device comprises a Type-C device.

15. The method of claim 11, wherein the second electronic device is a terminal device.

16. The method of claim 13, further comprising an analog-to-digital conversion circuit coupled to the key circuit and configured to convert the signal from an analog signal to a digital signal wherein the second electronic device is a terminal device.

17. The method of claim 16, further comprising a play circuit coupled to the analog-to-digital conversion circuit and configured to play an audio signal output by the analog-to-digital conversion circuit.

18. The method of claim 16, further comprising a collection circuit coupled to the analog-to-digital conversion circuit and configured to:

collect a sound signal; and input the sound signal to the analog-to-digital conversion circuit.

19. The method of claim 13, further comprising:

starting, by the control processing circuit, the second USB circuit after receiving the PD signal;

waking up, by the second USB circuit, the first USB circuit;

establishing, by the second USB circuit, a USB link to the first USB circuit;

obtaining, by the second USB circuit, a key value of the key operation;

sending, by the second USB circuit, the key value to the control processing circuit; and performing, by the control processing circuit, an operation corresponding to the key value based on the key value.

20. The method of claim 11, further comprising coupling the first electronic device to the second electronic device using Type-C USB interface.

* * * * *